United States Patent [19]
Galick et al.

[11] Patent Number: 5,110,667
[45] Date of Patent: May 5, 1992

[54] POLYMER COMPOSITION IMPARTING LOW SURFACE ENERGY

[75] Inventors: Stephen J. Galick; James E. Sax, both of Oakdale, Minn.

[73] Assignee: Minnesota Mining and Manufacturing Company, Saint Paul, Minn.

[21] Appl. No.: 498,984

[22] Filed: Mar. 26, 1990

[51] Int. Cl.⁵ .......................... B32B 7/06; B32B 7/12; B44C 1/65
[52] U.S. Cl. .................... 428/202; 156/230; 156/241; 428/421; 428/422; 428/474.4; 428/516; 428/520; 428/523
[58] Field of Search ............... 428/422, 40, 412, 516, 428/520, 523, 202, 474.4; 156/244.11, 272.2, 230, 241; 264/171

[56] References Cited

U.S. PATENT DOCUMENTS

| | | | |
|---|---|---|---|
| 4,025,159 | 5/1977 | McGrath | 156/272.2 |
| 4,248,748 | 2/1981 | McGrath et al. | 428/412 X |
| 4,582,736 | 4/1986 | Duncan | 428/40 |
| 4,673,611 | 6/1987 | Crass et al. | 428/516 |
| 4,702,874 | 10/1987 | Ohara et al. | 264/171 |
| 4,713,273 | 12/1987 | Freedman | 428/40 |
| 4,839,123 | 6/1989 | Duncan | 156/244.11 |
| 5,025,052 | 6/1991 | Crater et al. | 524/104 |

FOREIGN PATENT DOCUMENTS

0260011A2 3/1988 European Pat. Off. .
0377289 7/1990 European Pat. Off. .
61-40252 9/1986 Japan .

OTHER PUBLICATIONS

Information folders Numbers 10-12 on Application of reflective sheeting using heat lamp vacuum applicator, by 3M.

Primary Examiner—Thomas J. Herbert, Jr.
Attorney, Agent, or Firm—Douglas B. Little; Gary L. Griswold; Walter N. Kirn

[57] ABSTRACT

Polymer blend useful in making release liners, especially for reflective sheeting, comprises:
A. a matrix polymer (e.g., a polyolefin);
B. a filler such as $CaCO_3$;
C. a fluorocarbon, such as a 2-oxazolidinone compound.

Typical proportions are: polypropylene 54.5%, $CaCO_3$ 45%, and fluorochemical oxazolidinone 0.5%.

Liners made of this composition can be used both in the process of manufacturing reflective sheeting and as release liners on finished product, thus combining process and product liner into one. They can also be used as a slip sheet in bonding reflective sheeting to sign blanks or substrates.

11 Claims, No Drawings

POLYMER COMPOSITION IMPARTING LOW SURFACE ENERGY

TECHNICAL FIELD

This invention is in the field of polymeric blend compositions having low surface energy, useful in release liners for protecting adhesive coatings. More specifically, it pertains to blends of polymers, such as polyolefins, with fillers and fluorocarbons and the use of such blends in release liner compositions.

BACKGROUND

Many manufactured or functional articles made in the form of a web or sheet, such as decals, reflective sheeting and labels, have one side intended to face a viewer (graphic side) and a back side on which is coated an adhesive (e.g., pressure sensitive adhesive (PSA) or heat activated adhesive). The adhesive coated side requires protection to prevent premature adhesion of the article to some substrate other than the desired one. That protection is often provided by a release liner, i.e. a sheet or web applied over the adhesive coated side which is easily removed and leaves the adhesive intact. Typical release liners are made of silicone coated paper or silicone coated film.

In the manufacture of the aforementioned functional articles, a release liner can sometimes be used. Release liners for use in a manufacturing process will be called process liners in this description. A process liner (e.g., paper or polyester film carrier web coated with a silicone, polyethylene or other release layer) can be coated with adhesive and laminated to a functional top film to produce an adhesive backed product. After the lamination, the adhesive adheres better to the functional top film than to the process liner; so that, when the process liner is removed, the adhesive remains with the functional sheet. These process liners are relatively expensive because the process for coating the release layer is expensive, and it adds another process step. The silicone or polyethylene release coating often does not adhere well to the carrier web, is transferred with the adhesive and remains as a contaminant on the back of the functional sheet.

The process liner is sometimes not an acceptable product liner for reflective or other functional sheetings due to deficiencies in dimensional stability, handling characteristics, cuttability or appearance. Release liners for finished adhesive coated articles will be referred to herein as product liners. Thus, the process liner for reflective sheeting can be replaced with a product liner in a separate process step. The product liner is often silicone coated or uncoated polyolefin film having good dimensional stability, handling, and appearance, but which can not withstand the high temperatures and mechanical stresses of the manufacturing process to which the process liner is exposed.

It would be highly desirable to have a release liner serve as both process and product liner.

DISCLOSURE OF INVENTION

A polymer blend has been developed for release liner films which can serve both as process and product liner in processes such as those described above. The inventive blend can be summarized as a composition comprising:

A. a matrix polymer selected from the group consisting of polyolefins, polystyrene, polyamides, and polymethylmethacrylate;

B. a filler selected from the group consisting of metal oxides or hydroxides, silicas, barytes, metal silicates and carbonates, natural or synthetic zeolites, and natural or calcined clays; metal fibers, powders and flakes; cellulosic fibers; glass fibers, powder, hollow spheroids or beads; and polymeric materials having a softening point or melting point above the temperature at which the polyolefin is processed in making the polymer blend, in a concentration of about 1 to about 80 weight percent;

C. a fluorocarbon selected from the group consisting of: 2-oxazolidinone compounds comprising one or more 2-oxazolidinone moieties

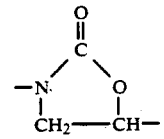

at least one of which has a monovalant fluoroaliphatic radical $R_1$ bonded to the 5-position carbon atoms thereof by an organic linking group;

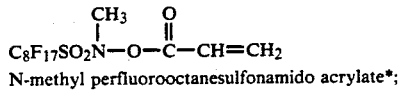

N-methyl perfluorooctanesulfonamido acrylate*;

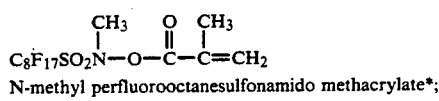

N-methyl perfluorooctanesulfonamido methacrylate*;

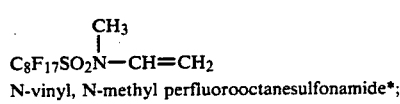

N-vinyl, N-methyl perfluorooctanesulfonamide*;

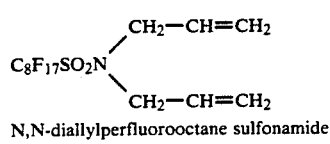

N,N-diallylperfluorooctane sulfonamide

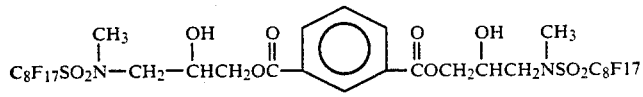

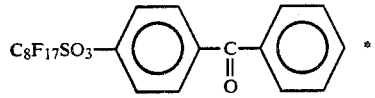

perfluorooctyl sulfonic ester of 4-hydroxy benzophenone;

which flurocarbon is present in a concetration of 0.1 to 20 weight percent.

*Available from Minnesota Mining and Manfacturing Company, St. Paul, Minnesota.

Substituents bonded to the N of the oxazolidinone structure are typically those taught in EPO Publication 260,011 published Mar. 16, 1988 which is incorporated by reference herein.

Release liners made with the inventive polymer blend have improved physical properties at temperatures up to 80° C. and web tensions of 2 MPa (MegaPascals).

When used as a process liner in an adhesive coating process, the inventive release liner has provided adhesive release of 100 g/cm or less. This, along with its excellent dimensional stability and low flexural modulus, make it an excellent product liner as well. The invention provides a release liner which eliminates the step of transferring the product from a process to a product liner and reduces raw material costs.

DETAILED DESCRIPTION

This invention uses a combination of filler and fluorochemical additive which can be processed with the matrix polymer by extrusion processing. The matrix polymer preferably has a processing temperature (melt temperature) of less than 360° C., more preferably less than 300° C. It should also be characterized by low moisture absorption or be treated or modified to reduce its moisture absorption. Some useful matrix polymers are: polypropylene, poly methyl pentene, and high and low density polyethylenes.

Examples of useful fillers are: $TiO_2$, $CaCO_3$, mica, talc, bentonite clay, magnesium silicon dioxide, montmorillonite clay, and barium sulfate. The concentration of the filler is preferably 20-65 weight percent. Filler particle size distribution is typically about 0.4-50 micrometers, preferably 0.4-14 micrometers. It preferably is present in sufficient proportion to yield a film 90 micrometers thick which will stretch less than five percent under a tension of 2 MPa when exposed to a temperature of 80° C. The filler helps to obtain sheet materials made with the inventive polymer blend having easier handling, and can give higher thermal conductivity. At lower filler concentrations, greater sheet thickness is required for desired handling characteristics.

Certain of the fluorocarbons are commercially available; while, others can be synthesized. The synthesis of some of them can be found in European Patent Publication No. 260,011. The synthesis of

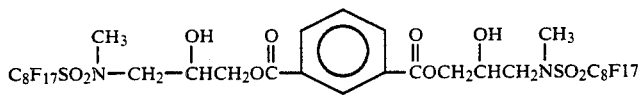

is by the method taught in U.S. Pat. No. 3,870,748, see column 4, using as the epoxide

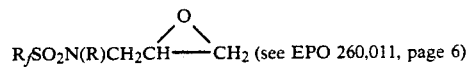

wherein $R_f$ is $C_8F_{17}$, and reacting it with isophthalic acid. The preparation of sulfonamides such as N,N-dialyperfluorooctanesulfonamide is found in U.S. Pat. No. 2,803,656.

The concentration of the fluorocarbon is preferably 0.3-10.0%, more preferably 0.5-2.0 weight percent. Typically, the fluorocarbon has a melting point above 100° C., preferably above 125° C.; it does not evaporate or degrade below 250° C., preferably below 350° C.; and its molecular weight is less than 20,000. A preferred oxazolidinone is

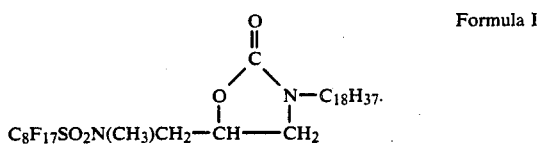

Formula I

This fluorochemical oxazolidinone is synthesized by Scheme I at page 4 of EPO Publication 260,011 using as $R_fSO_2N(R)H$, N-methyl perfluorooctanesulfonamido methacrylate and as A-NCO, octadecyl isocyanate. Another useful oxazolidinone is

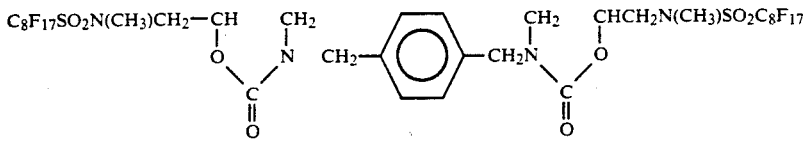

the synthesis of which is taught in EPO 260011.

The fluorochemical imparts a lower surface energy and improved release characteristics to the polymer blend. Preferably, it does not substantially transfer to the adhesive on the back side of a manufactured article (to which the liner may be applied) with aging and does not change the adhesive properties.

The inventive polymer blend composition is made by admixing the matrix polymer, filler and fluorocarbon. Additives which are known in the plastics compounding art, such as pigments, fungicides, antistatic chemicals, and additives to stabilize against degradation by ultraviolet light or heat, can also be admixed. One admixing process is to mix the dry powder ingredients in a tumbling mixer at elevated temperature (e.g., 66° C.). An alternative process is to add the fluorocarbon to a melt comprising the matrix polymer and filler in an extruder, at an extruder injection port. If the fluorocarbon is a solid, it can be injected as a melt or with a solvent. If a solvent is used, there would normally be a devolatilization zone in the extruder with a vent for escaping solvent vapors.

A release liner can be made in a single extrusion operation, extruding a film with the appropriate thickness and surface finish. The polymer blend is extruded in a single screw extruder and through a single manifold film die. Preferably, the extruder has a mixing section designed to give high shear and dispersive plus distributive mixing. The extruder used for some of the research which lead to this invention had a compression ratio of 3:1 and a length:diameter ratio of 30:1. The process conditions used on that extruder to make a release liner 15 cm wide and about 100 micrometers thick, from a polymer blend comprising 45% polypropylene, 45% $CaCO_3$, 9.4% $TiO_2$, 0.1% antioxidant (obtained as Irganox 1010 from Ciba-Geigy) and 0.5% fluorochemical oxazolidinone of formula I above, are given in Table 1 below:

TABLE 1

| Extruder zone | Temperature (°C.) | Pressure kPa |
| --- | --- | --- |
| 1 | 160 | 1,700 |
| 2 | 200 | 8,200 |
| 3 | 230 | 14,600 |
| 4 | 232 | 4,100 |
| Extruder End-cap | 232 | |
| Neck tube | 232 | |
| Die | 232 | |

Extruder rotational speed - 45 rpm:
speed of extruded film - 4.2 m/min.
film thickness - 89 micrometers
casting roll temperature - 16° C.

The extrusion temperature preferably does not exceed 300° C. From the die, the extruded release liner film is transferred to a casting roll to cool. A useful range of casting roll temperature is 49°-82° C.

It is in the steps after the due (such as the casting roll) that the release liner film acquires surface finish. For example, after the due, the film may pass through a two roll calender in which one roll is a chromium plated steel roll with a mirror finish and the pressure or nip roll (pressing the release liner against the chromium plated roll) is made of a resilient material, such as rubber. The side of the liner facing the chromium plated roll will acquire a glossy surface; while, the other side may have a matte finish.

The release liner may also be uniaxially or biaxially oriented after extrusion and casting, to improve mechanical strength or release characteristics. After the casting roll or calender and possible orientation steps, the liner is typically slit and wound up in a roll.

A preferred release liner is made of polyolefin, preferably polypropylene, with 10-50% by weight $CaCO_3$ and 0.5-1.0% fluorochemical of formula I. Typically, the thickness of the release liner is 25-250 micrometers, preferably 75-175 micrometers.

The liner may be embossed, be coated, carry printing or otherwise be modified so long as release characteristics and dimensional stability are not adversely affected. It may also be clear or translucent to allow viewing of the adhesive side of the functional product without removal of the liner.

It is desired that stretch of the inventive release liner be limited, preferably to less than 5% under a tension of 2 MPa when exposed to a temperature of 80° C. The reason for the limitation on stretch of the liner is that, if the web stretches during processing, shrinkage can occur after a functional product sheet is laminated to the liner. Such shrinkage may become worse through storage, especially at temperatures above 32° C., and may lead to wrinkling, curl, or adhesive exposure in the product. In the case of reflective and other graphic sheeting, wrinkles can cause visible defects in signs in later sign making applications, while curl can prevent the sheet from being readily screen printed.

A technique for measuring stretch on a Perkin-Elmer TMA - 7 apparatus is as follows:

1. At 20° C., apply tensile stress (e.g. 635 millinewtons on a sample 3.175 mm. wide and 100 micrometers thick) to sample release liner and equilibrate for 10 minutes, and measure length ($L_1$);
2. heat sample at 5° C./min. to 80°;
3. lower temperature to room temperature;
4. after waiting 5 to 7 minutes, when the apparatus has cooled to 20°-21° C., equilibrate for 10 additional minutes, then measure length ($L_2$);
5. calculate percent change $$\frac{L_2 - L_1}{L_1} \times 100 = \text{percent change, a}$$

positive number indicating stretch, and a negative number indicating shrinkage.

Stretch is affected by process conditions. Process conditions which increase matrix polymer crystallinity also lower stretch. For example, polypropylene crystallinity is increased by using a hotter casting roll.

A product liner protects the product to which it is laminated from: premature adhesion to unintended substrates; dirt or contamination; and scratches or impressions. Preferably, when used as a product liner, the inventive release liner is readily cut by die cutters, has good release characteristics and can also serve as a slip sheet for protecting the functional product face. Being readily cut by die cutters means that the liner cuts cleanly without forming stringers. Good release characteristics are indicated by clean release of the liner from an adhesive backed functional article in a 180° peel test at a peel rate of 30 cm/min. using no more than 200 g. force per inch (2.54 cm) width, preferably no more than 150 g. force per inch of width, more preferably no more than 100 g. force per inch of width.

It is preferred to have at least one glossy side for use as a slip sheet. A slip sheet is a sheet of material placed in contact with a face of an article (usually a flat article such as a sign) to protect it from damage. The slip sheet prevents the sign face from being damaged during handling and during high temperature application of the sign face to a substrate, as done in a heat lamp vacuum applicator (HLVA) to be explained later. For example, it protects inks which may be screened or printed on the sign surface from contamination, peeling or smearing. It also protects from impressions being made in the sign face.

The inventive release liner can be characterized by a fluorine rich surface. Greater than 10% fluorine in at least one surface (the outermost 30-60 Angstroms) is desired for good release properties. The presence of 1-40% fluorine at the surface has been verified in samples by x-ray photoelectron spectroscopy (XPS or ESCA).

A multi-layer construction is also possible, wherein one layer contains the filled matrix polymer for high temperature mechanical strength, and another, surface layer, contains a blend of the fluorocarbon and matrix polymer to provide release characteristics.

The inventive release liner can be coated with or laminated over the following types of adhesives:

I) heat activated adhesive. A useful heat activated adhesive comprises a PSA acrylate polymer and a tackifying resin, the latter being included in sufficient amount to reduce the room temperature pressure sensitive adhesion of the complete heat activated adhesive to less than the adhesion of the PSA acrylate polymer prior to addition of the tackifying resin, as taught in U.S. Pat. No. 4,248,748. Typical PSA acrylate polymers for these adhesives are comprised of at least 50% acrylic or methacrylic acid ester or an ester of that type. Useful tackifying resins can be selected from known resins, generally thermoplastic, room temperature solids characterized by an ability to increase the tackiness of natural rubber, such as wood rosins, modified forms of naturally occurring rosins (hydrogenated or esterified rosins), polymers of terpene, pinene and low molecular weight styrene. Pressure sensitive adhesives (tested by pressing a 25-micrometer thick polyester film coated with the PSA against a polycarbonate panel and measuring force required to peel the film from the panel at 90°) typically exhibit an adhesive force of at least 200 grams per centimeter of sample width. An effective proportion of tackifying resin will lower the room temperature pressure sensitive adhesion to less than 100 g./cm. width in the 90° peel adhesion test, making it easier for users to handle and position articles coated with the adhesive, since it does not become adhered into place prematurely. A small room temperature pressure sensitive adhesion or preadhesion (about 35 g./cm. width) is useful to keep adhesive coated articles in place during handling operations prior to heat treating which activates the adhesive.

ii) hot melt acrylate adhesive; or iii) a PSA.

There are several types of retroreflective sheeting on which the inventive release liner may be used, such as exposed lens (as taught for example in U.S. Pat. No. 2,326,634 and 2,354,018), embedded lens (see U.S. Pat. No. 2,407,680) and encapsulated lens (see U.S. Pat. No. 4,025,159) sheeting. These sheeting types and methods for manufacturing them are known to the art. The drawings of the aforementioned patents (U.S. Pat Nos. 4,025,159; 2,407,680, and 2,326,634) illustrate the various sheeting types and are incorporated by reference herein. This discussion is only illustrative of the types of sheeting on which the inventive release liner can be used, and other types of sheeting such as cube corner reflective sheeting and sheeting for decals and graphic designs can benefit from the invention as well.

To make reflective sheeting having a back side coated with the previously described heat actived adhesive which is covered by the inventive release liner, the following steps may be taken:

1. coat the liner web with the heat activated adhesive in solution, by, for example, knife coating;
2. dry the adhesive coating;
3. laminate the adhesive coated side of the release liner to the back side of a web of encapsulated lens reflective sheeting by transporting the release liner and reflective sheeting web between the rolls of a laminating apparatus. Conditions which have been used in lamination are: 82° C., and nip roll pressure of 620 kPa.
4. slit the product to desired width and wind into rolls.

One heat actived adhesive which has been successfully used is comprised of isooctylacrylate, methacrylic acid and acrylic acid in a ratio of 58/35/7, and a tackifier. Peel tests were conducted on reflective sheeting made in accordance with the above process laminating at nip roll pressure 4 kg./in. width (1.6 kg/cm.) using the liner previously described, made of the components described in Table 2. The inventive release liner listed in Table 2 is comprised of 49.5 weight percent polypropylene (Exxon grade 3014, 9 melt flow index), 50% $CaCO_3$, and 0.5% fluorochemical oxazolidinone of Formula I, and the just described adhesive. Observations indicate that the release liner had good release properties and met process requirements.

The peel test was done at room temperature, 30 cm./min. peel rate and 180° peel angle. Test samples were laminated by the aforementioned process, and strips 1.2 cm wide by 15 cm. long were cut for peel testing. Peel force was measured immediately after sample preparation and after aging in an air convection oven at 66° C. for one week.

The ability of the samples to withstand the lamination process was measured qualitatively by the amount of curl in the film after the lamination process. It is preferable to have a liner which exhibits no curl after the lamination process. The peel test data is given in Table 2 below.

TABLE 2

| Sample | Initial Peel Force (g./inch) | Aged Peel Force (g./inch) | Curl |
|---|---|---|---|
| Silicone coated paper | 20 | 24 | none |
| Polypropylene | 450 | 880 | severe |

TABLE 2-continued

| Sample | Initial Peel Force (g./inch) | Aged Peel Force (g./inch) | Curl |
|---|---|---|---|
| Biaxially oriented polypropylene | 516 | 538 | slight |
| Ultra Low Density Polyethylene | 26 | 34 | severe |
| Low Density Polyethylene | 216 | 268 | severe |
| Low Density Polyethylene with 0.5 weight percent flurochemical oxazolidinone | 13 | 37 | severe |
| Polypropylene with 0.5 wt. % flurochemical oxazolidinone (as described in European patent No 0 260 011) | 22 | 111 | severe |
| Polypropylene with 40% CaCO3 | 490 | 1392 | none |
| Inventive Release Liner (50% CaCo3) | 64 | 57 | none |

The above data show that the release liner of this invention has good release values (below 200 g/inch) and will produce a good quality film after the lamination process.

Table 3 gives the peel force, surface fluorine concentration, and curl for a number of embodiments of the inventive release liner.

TABLE 3

| Wt % Formula I | Wt % CaCO3 | Peel Force | ESCA Wt % F | Curl |
|---|---|---|---|---|
| 0.0 (Polypropylene control) | 0.0 | 880 | 0 | severe |
| 0.1 | 30 | 760 | 1.0 | none |
| 0.35 | 30 | 84 | 12 | none |
| 0.5 | 45 | 58 | 39 | none |
| 0.75 | 45 | 43 | 39 | none |
| 1.0 | 45 | 74 | 37 | none |
| 1.25 | 40 | 51 | 40 | none |
| 1.5 | 45 | 57 | 40 | none |
| 0.75 | 55 | 165 | 37 | none |
| 0.75 | 50 | 51 | 40 | none |
| 0.75 | 40 | 36 | 35 | none |
| 0.75 | 35 | 51 | 36 | none |

The reproducibility of the weight percent F at the surface of the extruded films, as determined by ESCA, is −10% of the reading. The reproducibility of the force measurement is −20 grams/inch. The samples examined in this table were made in an identical fashion as the samples described in Table 2.

Reflective sheeting is often made into signs by laminating it to a backing or substrate, typically sheet metal (e.g. aluminum). A known apparatus for accomplishing this lamination with heat activated adhesives is the heat lamp vacuum applicator (HLVA), which comprises a steel frame on which are mounted: a perforated steel base plate; a neoprene rubber diaphragm; and a steel wire spring counter-balanced lamp bank. The HLVA also includes a temperature controller and is available from Conteh, Inc., Goddard, Kans., U.S.A and Greco Mfg. Inc., Niles, Mich., U.S.A.

For encapsulated lens retroreflective sheeting, the HLVA procedure is generally as follows:
A. remove release liner from back of reflective sheeting;
B. place sign blank (backing) on a flat surface and position reflective sheet on sign blank;
C. apply or preadhere reflective sheeting to blank using rollers to apply pressure;
D. place sign on a loading board (e.g., 9.5 mm. thick plywood board having a multiplicity of 3 mm. holes drilled through it and covered with cloth, such as muslin) which is placed on the perforated steel base plate, sign face up, placing inventive release liner, removed in step A., as slip sheet over sign face, glossy side toward the reflective sheeting.
E. position sign under thermistor in the HLVA, for temperature control;
F. start vacuum;
G. lower diaphragm over sign and latch it, waiting 1 minute after vacuum gage reaches proper reading;
H. turn lamp bank on, lower heat lamp bank over the diaphragm, and begin heat lamp cycle of the HLVA;
I. when the cycle is terminated, open the apparatus, and remove sign.

The vacuum and the arrangement of the sign back over a foraminous surface help to remove any air bubbles from under the reflective sheeting and hold the sheet in place during activation of the adhesive. The heat lamps provide the heat to bring the adhesive to full strength. Although the encapsulated lens type sheeting is not perforated, other types of reflective sheeting (e.g., enclosed lens) are perforated with tiny holes prior to using them in the HLVA process explained above to promote the flattening and bonding of the sheeting to the backing.

What is claimed is:

1. The combination of a graphic sheet having adhesive on the back side and, covering the adhesive back side, a liner sheet comprising a polymer blend composition useful in making release liners comprising:

A. a matrix polymer selected from the group consisting of polyolefins, polystyrene, polyamides, and polymethylmethacrylate;
B. a filler selected from the group consisting of metal oxides; metal hydroxides; metal silicates; metal carbonates; silicas; barytes; zeolites; clays; metal fibers, powders and flakes; cellulosic fibers; glass fibers, powder, hollow spheroids or beads; and polymeric materials having a softening point or melting point above the melt temperature of the matrix polymer; said filler being in a concentration of about 1–80 weight percent;
C. a fluorocarbon selected from the group consisting of: (i) 2-oxazolidinone compounds comprising one or more 2-oxazolidinone moieties having the formula:

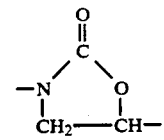

at least one of which has a monovalent fluoroaliphatic radical $R_1$ bonded to the 5-position carbon atom thereof by an organic linking group;

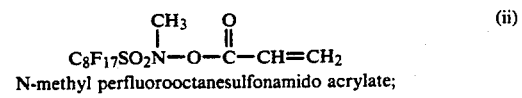

N-methyl perfluorooctanesulfonamido acrylate;

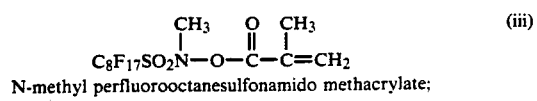

N-methyl perfluorooctanesulfonamido methacrylate;

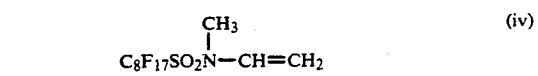

-continued

N-vinyl, N-methyl perfluorooctanesulfonamide;

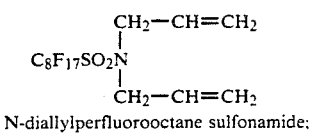

N, N-diallylperfluorooctane sulfonamide;

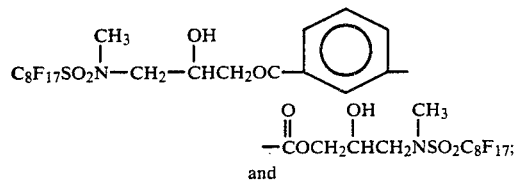

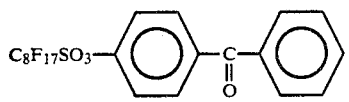

perfluorooctyl sulfonic ester of 4-hydroxy benzophenone;

which fluorocarbon is present in a concentration of 0.1 to 20 weight percent.

2. The combination of claim 1 in which the matrix polymer is a polyolefin which has a melt temperature below 360° C.

3. The combination of claim 1 wherein the filler is calcium carbonate.

4. The combination of claim 1 wherein the filler is selected from the group consisting of $CaCO_3$, $TiO_2$ and glass fibers.

5. The combination of claim 1 wherein the concentration of the fluorochemical is at least 0.3 weight percent.

6. The combination of claim 1 in which the liner sheet is characterized by a fluorine rich surface.

7. The combination of claim 1 wherein the fluorochemical is selected from fluorochemical oxazolidinones.

8. The combination of claim 1 wherein the fluorochemical oxazolidinone has the formula

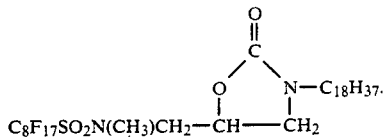

9. The combination of claim 1 in which the matrix polymer is selected from the group consisting of polypropylene, polyethylene and polymethylpentene.

10. The combination of claim 9 which further comprises another polymer in addition to the matrix polymer.

11. A process of making a sign comprising the steps of:
  A. providing a sign blank and a sign sheet comprising the combination of an adhesive coated graphic sheet and a liner sheet covering the adhesive as recited in claim 1 wherein the adhesive is a heat activatable adhesive;
  B. removing the liner sheet from the back of the sign sheet;
  C. placing the sign blank on a flat surface and positioning the sign sheet with the adhesive coated side against the sign blank;
  D. placing the liner sheet, removed in step B, as a slip sheet over the sign face;
  E. pre-adhering the sign sheet to the sign blank to form a sign; and
  F. exposing the sign to heat sufficient to activate the adhesive.

* * * * *

UNITED STATES PATENT AND TRADEMARK OFFICE
CERTIFICATE OF CORRECTION

PATENT NO. : 5,110,667
DATED : May 5, 1992
INVENTOR(S) : Stephen J. Galick and James E. Sax It is certified that error appears in the above-identified patent and that said Letters Patent is hereby corrected as shown below:

Col. 2, line 48, delete the "*" after acrylate.
Col. 2, line 54, delete the "*" after methacrylate.
Col. 4, lines 63-64, delete "$R_fSO_2N(R)H$, N-methyl perfluorooctanesulfonamido methacrylate and as".

Signed and Sealed this

Seventh Day of September, 1993

*Attest:*

BRUCE LEHMAN

*Attesting Officer*   Commissioner of Patents and Trademarks